US006408369B1

(12) United States Patent
Garrett et al.

(10) Patent No.: US 6,408,369 B1
(45) Date of Patent: Jun. 18, 2002

(54) INTERNAL COPY FOR A STORAGE CONTROLLER

(75) Inventors: Brian Garrett, Hopkinton; Haim Kopylovitz, Brookline; Hana Moreshet, Framingham, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/041,401

(22) Filed: Mar. 12, 1998

(51) Int. Cl.[7] .............................................. G06F 12/02
(52) U.S. Cl. ...................................... 711/165; 711/162
(58) Field of Search ................................ 711/165, 163, 711/162

(56) References Cited

U.S. PATENT DOCUMENTS

| 4,506,323 A | * | 3/1985 | Pusic et al. ................. 711/165 |
| 5,341,493 A | * | 8/1994 | Yanai et al. ................ 711/161 |
| 5,418,763 A | * | 5/1995 | Ichikawa et al. ............ 369/30 |
| 5,544,347 A | * | 8/1996 | Yanai et al. ................ 711/162 |
| 5,581,740 A | * | 12/1996 | Jones .................... 395/500.46 |
| 5,615,330 A | * | 3/1997 | Taylor ........................... 714/7 |
| 5,781,908 A | * | 7/1998 | Williams et al. ............ 707/104 |
| 5,787,487 A | * | 7/1998 | Hashimoto et al. ......... 711/165 |
| 5,829,045 A | * | 10/1998 | Motoyama .................. 711/165 |
| 5,835,954 A | * | 11/1998 | Duyanovich et al. ....... 711/165 |

* cited by examiner

Primary Examiner—Hiep T. Nguyen
(74) Attorney, Agent, or Firm—John M. Gunther; Penelope S. Wilson

(57) ABSTRACT

A storage system has a storage controller connected to a plurality of storage devices. The described system and method transfer physical data from a first storage device to a second storage device. The method does not involve a host computer in the physical data transfer thereby saving both computer CPU time and system bandwidth. The method receives an internal copy command from a commanding processor (the host) over a controller input path, reads at least one block of data, in data block format, from the first storage device, stores the requested data in a volatile memory in the controller, and sets a state of the pending stored data as a write pending state. The controller then destages the write pending memory stored data to the second storage device.

16 Claims, 4 Drawing Sheets

INTERNAL COPY FOR A STORAGE CONTROLLER

BACKGROUND OF THE INVENTION

The invention relates generally to the transfer of data from one storage element to another, and more particularly, to a method and apparatus for reducing host computer involvement in the transfer operation.

As host computers become more and more powerful, as well as more complex, it is important to maintain the primary focus of the host computer on activities other than peripheral data handling. In particular, in a copy or transfer from one disk drive unit to another, the host computer can, and will, spend a considerable time simply reading data from one disk drive unit into its own memory and then writing the data from its own memory to a second disk drive unit. This activity can occupy not only substantial host computer CPU cycles but, in addition, substantial amounts of bus bandwidth. Such a resource use is especially intrusive if the bus bandwidth is low or small, or, if the transfer rate from the disk drive controller is high.

Thus, in addition to freeing up CPU time at the host computer, it is desirable to reduce the data transfer activity from a disk drive controller to the host computer, leaving the communications channel available for other operations. When a SCSI bus is used, other peripherals on the bus can then be given considerably greater access to the bus.

SUMMARY OF THE INVENTION

The invention relates to a storage system which has a storage controller connected to a plurality of storage devices. The invention of the system and method features operating the system to transfer physical data from a first storage device to a second storage device. The method does not involve the host computer in the physical data transfer thereby saving both computer CPU time and system bandwidth. The method features receiving an internal copy command from a commanding processor over a controller input path, reading at least one block of data, in data block format, from the first storage device, storing the requested data in a volatile memory in the controller setting a state of the pending stored data as a write pending state, and destaging the write pending memory stored data to the second storage device.

The storage system, according to the invention, features a storage controller having a cache memory, at least one input port and at least a first and a second output port. The system further features a control processor connected to the at least one input port and two output ports. The at least two output ports connect to storage devices. The controller receives a transfer command from the outside source at the input port. The control processor responds to the transfer command by reading blocks of data specified in the command from a storage device connected to the first output port and storing the read data in the cache memory. The control processor associates a write pending flag with the stored read data. The control processor further destages the stored read data blocks to a storage device connected to the second output port.

In a particular aspect, the invention relates to a system for transferring data from a first storage device, accessible to a first command processor, to a second storage device accessible to a second command processor but not necessarily the first. In this aspect of the invention, the transfer is made internally of the storage controller rather than requiring the command processors to communicate directly with each other. Advantageously, this allows processors using different operating systems, otherwise incompatible with each other, to easily and quickly transfer data therebetween without the need for each of the command processors to be tied up in the physical transfer of the data.

The invention, thereby, advantageously provides a command processor or host computer with the additional selected ability to transfer data without itself being involved in the physical transfer process. In addition to saving computer time, bus transfer bandwidth is also made available for other devices. In particular aspects of the invention, otherwise incompatible processors are able to transfer data between storage devices to which they would otherwise not have access.

BRIEF DESCRIPTION OF THE DRAWING

Other objects, features, and advantages of the invention will be apparent from the following description taken together with the drawings in which.

DESCRIPTION OF A PARTICULAR EMBODIMENT OF THE INVENTION

Figure 1:
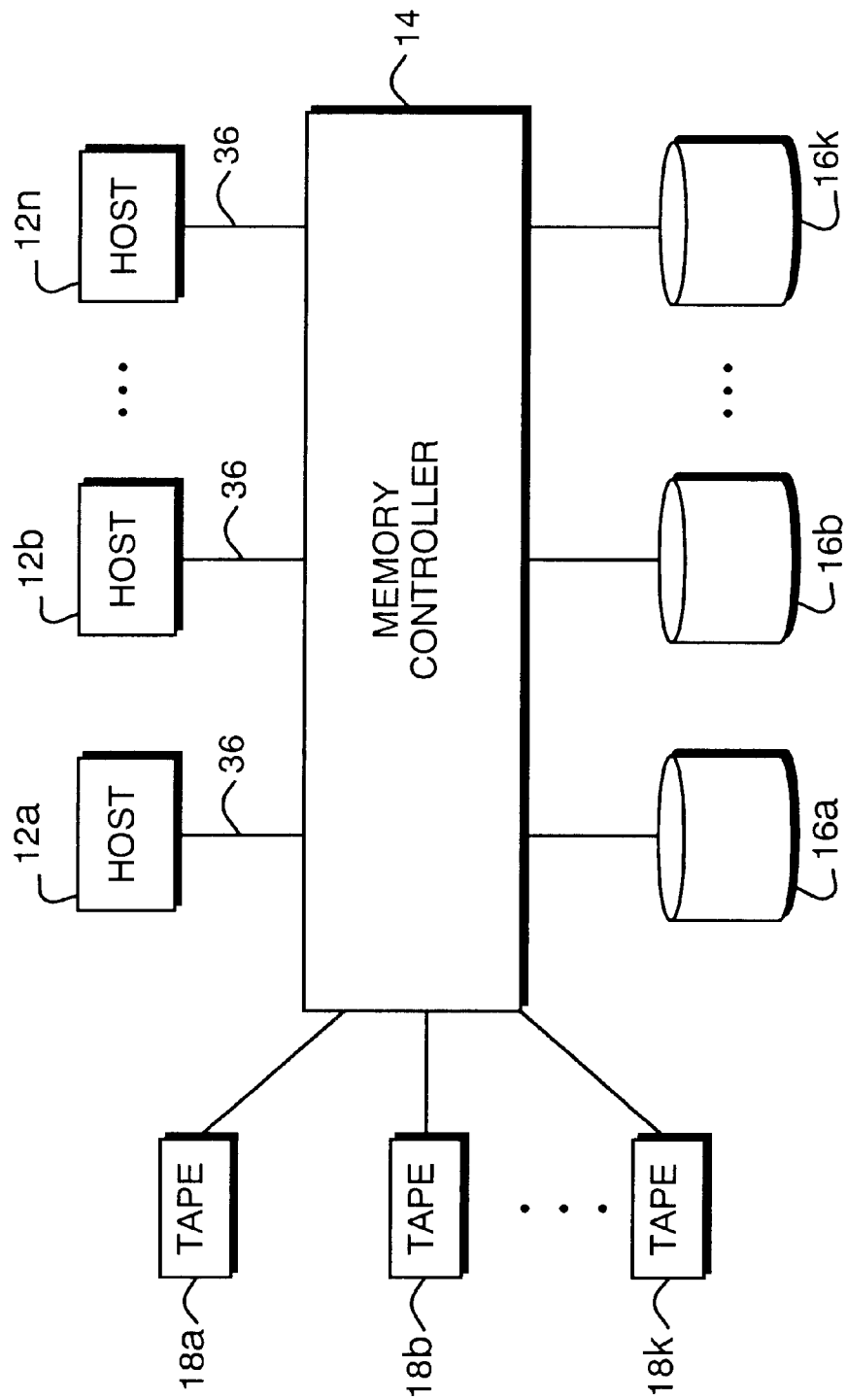
FIG. 1 is a block diagram of a typical computer storage system in which the invention is particularly useful.

Referring to FIG. 1, the invention relates to a computer system wherein at least one, and more likely a plurality of hosts 12a, 12b, . . . , 12n, connect to a storage controller system 14, such as the EMC Symmetrix disk array storage system. The storage controller 14 acts as the interface between the host computers and a plurality of mass storage devices, such as, for example, disk drives 16a, 16b, . . . , 16k. The mass storage devices may also include tape storage devices 18a, . . . 18k. Data written by the host or read from the disk drive elements pass through the storage controller system which acts as a two way communications path with substantial capabilities. For example, in some systems, the data from the host are uniformly striped across all of the disk storage devices; and in other systems, the data from the host are stored on the disk drives 16 according to a RAID protocol. In yet other embodiments of the invention, all of the data from a particular host can be stored on a single disk drive or in different logical volumes of the same or different disk drives, depending upon the nature and the source of the data and host, A host computer can also read data from one or more, but not necessarily all, of the disk drive units.

When a problem arises which impairs performance of the system, for example, a decrease in throughput, the problem can arise from simple operations performed by the host such as a large transfer or copying of data from one drive to another. Typically, in prior systems, the host would read the data from the drive, through the storage controller, and then write the data, through the same or a different controller to a second disk drive. This process uses substantial amounts of CPU time and bus bandwidth, as well as host memory.

Figure 2:
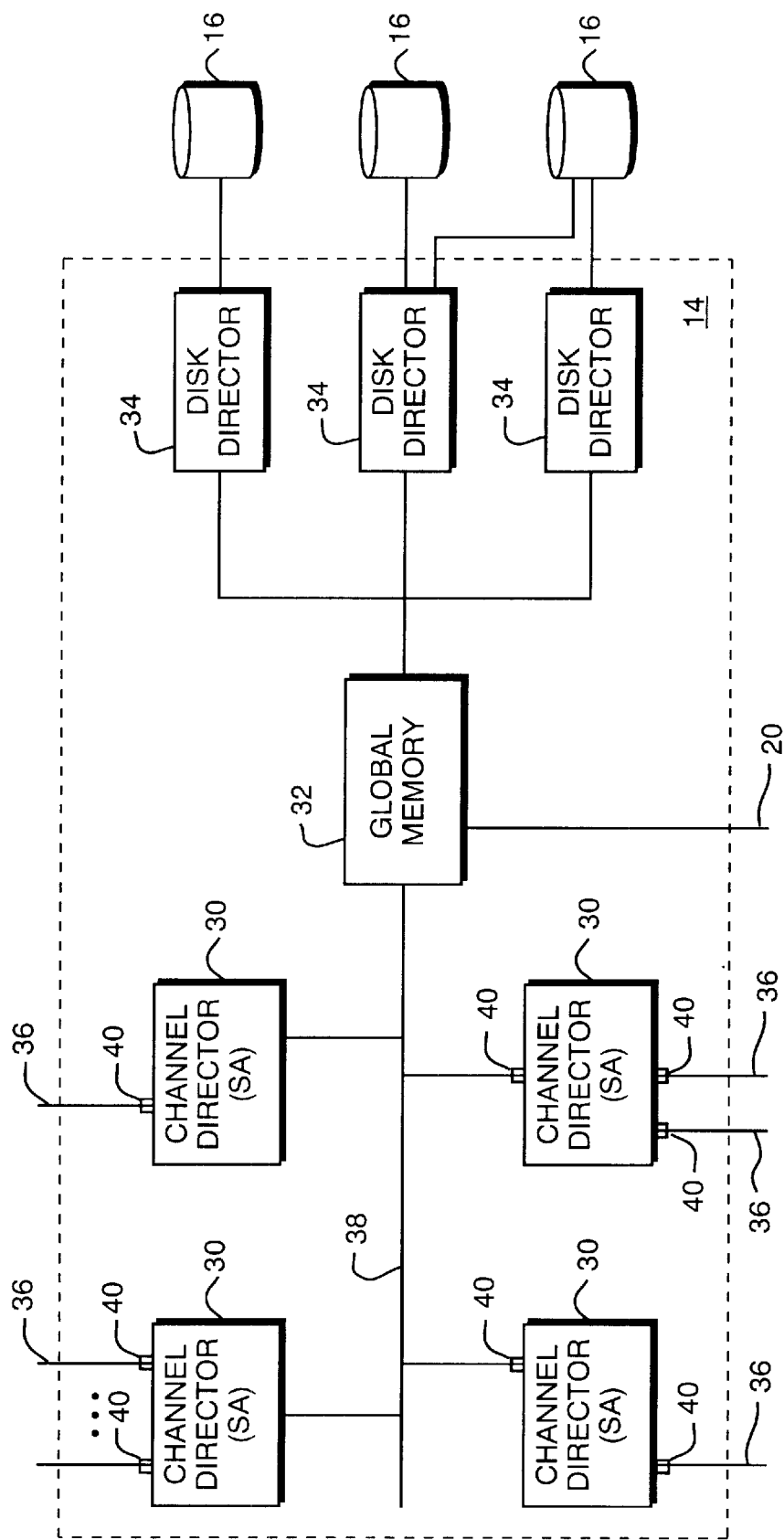
FIG. 2 is a more detailed block diagram of a storage system in which the invention finds particular use.

Referring to FIG. 2, in a particular embodiment according to the invention, the disk controller is configured to have a plurality of channel directors 30 (most often referred to a SCSI adapters (or SA's) when operating according to a SCSI protocol or fibre adapters when operating according to a fibre channel protocol) connecting to a global memory 32 through which all data and commands flow. The global memory 32 is connected to a plurality of disk directors 34 (typically SCSI adapters) which connect to the disk drives 16. In accordance with this particular embodiment of the invention, each channel director operates over channels 36 and 38 using a SCSI protocol. Each channel director 30 can be connected to one or more host computers over buses 36 (typically, one host I/O controller per port 40).

Figure 3:
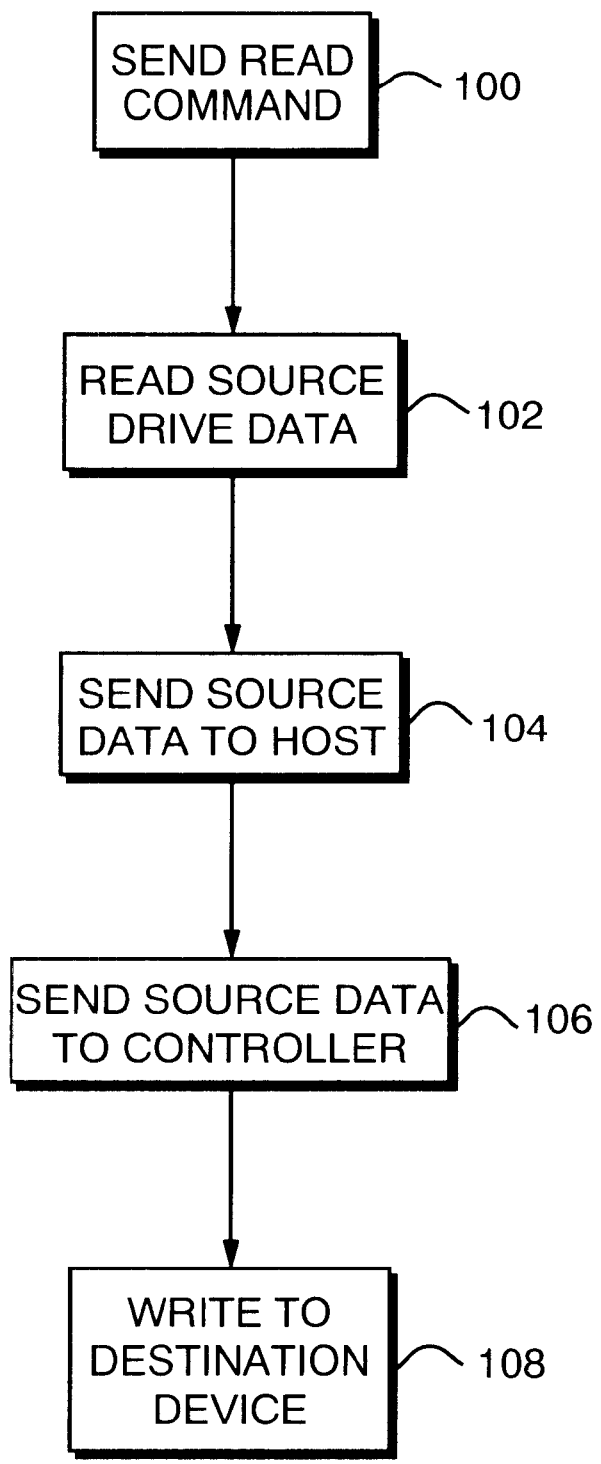
FIG. 3 is a flow chart in accordance with a prior method of operation.

Thus, referring to FIG. 3, in prior systems, a data copy, from one storage element to another, is initiated when, the host computer sends a read command (step 100) over, for example, the SCSI bus or a fiber channel bus 36 to the SCSI adapter or fiber channel adapter contained within the disk drive controller. In the Symmetrix controller, the system takes the command from the SCSI adapter or the fiber channel adapter, and causes the disk adapter to read (step 102) the data from the drive, typically over a SCSI bus 42. The data is then sent back (step 104) to the host computer over the SCSI channel or fiber channel 36 and is stored at the host. The host computer then sends the data back to the controller (step 106), including, this time the identification of the destination disk drive. The controller completes the data transfer (step 108) by writing to the destination device.

Figure 4:
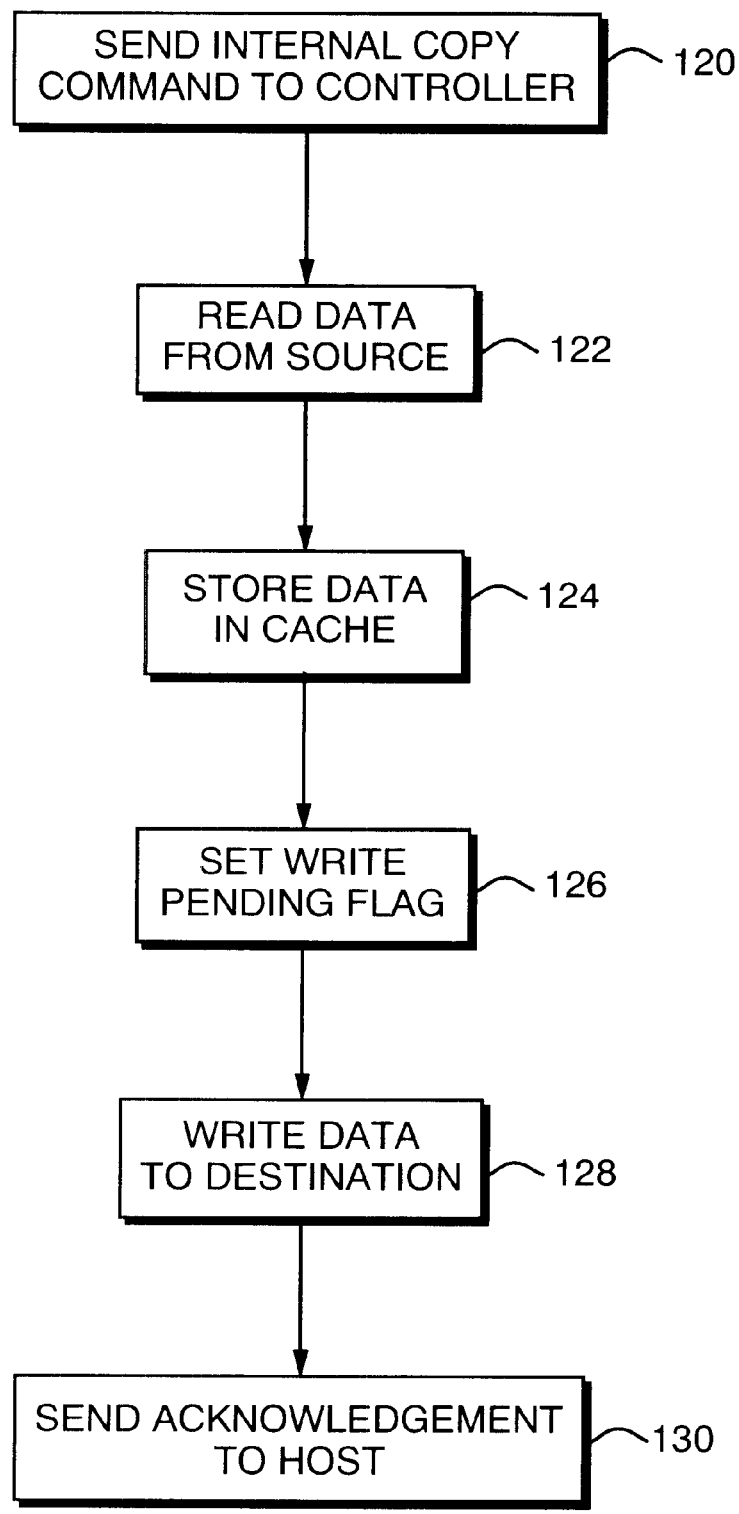
FIG. 4 is a flow chart in accordance with the operation of the invention.

Referring to FIG. 4, in operation according to the illustrated embodiment of the invention, a host computer issues a command (step 120) to the disk drive controller, in the illustrated embodiment a Symmetrix controller, which commands that the drive controller read data blocks from one disk drive unit (the source unit) and write them to another disk drive unit (the destination unit). The data blocks can be less than a full track of data, and can start at any offset from the beginning of a track. In practice, the disk drive controller first reads the required data (step 122) from the drive unit and places or stores it (step 124) in a shared cache (global memory 32) in the controller. The data is labeled "write pending" to the destination device. Thereafter, the controller, with the data stored in its cache, and labeled as write pending data (step 126), writes the data (step 128) to the second disk drive element. The host computer receives (step 130) an affirmative (or negative if appropriate) response from the controller as to whether or not the internal copy data operation has been completed. It is also important to note that in these disk operations, the host computer need not have access itself to the destination disk drive. Accordingly, not only is the host not involved in the actual physical transfer of the data on a byte by byte process (which would utilize substantial host computer CPU time), but the busses connecting the host computer to the disk drive controller are also not used and remain free for other operations.

According to the preferred embodiment of the invention, the host computer sends a system command over a channel, the SCSI channel or the fiber channel, to the SCSI adapter or fiber adapter respectively, of the controller at step 120. In response, the controller issues the command to the disk adapter to read the source data, typically and preferably in blocks, from the source disk drive. In accordance with the invention, the data is stored in cache memory within the controller, setting a write pending flag. As the result, therefore, the controller when it can write to the selected destination, will write that stored data to the selected destination disk drive and completes the operation. The controller then, in response to the host computer system transfer command, sends a command completed signal over the connecting channel.

If, for some reason, the system transfer command cannot complete, the controller returns a "command not completed" back to the host computer (at step 130) and the host computer can either try the operation again, or transfer the data using a "prior art" command sequence.

Additions, subtractions, and other modifications of the disclosed invention will be apparent to those practiced in this field and are within the scope of the following claims.

What is claimed is:

1. In a storage system having a storage controller connected to a plurality of storage devices organized into tracks that contain data, a method for transferring data from any first of said plurality of storage devices to any second of said plurality of storage devices comprising the steps of:

receiving an internal copy command from a commanding processor over a controller input path, such command identifying one or more blocks of data to be transferred, reading at least one block of data, in data blocks, from said first storage device in response to said command, wherein any such block of data may comprise less than a full track of data and may start at an offset from the beginning of the track;

storing said read data in a volatile memory in said controller and setting a state of said stored data as a write pending state, and destaging said write pending data from said volatile memory to said second storage device.

2. The method of claim 1 further comprising the step of returning a command status response to the commanding processor.

3. The method of claim 2 further wherein each of said storage devices is selected from the group of disk drive storage devices and tape storage devices.

4. The method of claim 1 wherein the first and second storage devices have both read access and write access.

5. The method of claim 4 wherein the first and second storage devices are disk drive storage units.

6. A storage system comprising:

a plurality of storage devices organized into tracks that contain data, and a storage controller having:
a cache memory,
at least one input port,
a plurality of output ports, each connected to at least one of said plurality of storage devices,
a control processor connected to the at least one input port and at least two of said output ports, said control processor receiving a transfer command from an outside source at said at least one input port,
said control processor responding to said transfer command by identifying a source storage device and a destination storage device from any of said plurality of storage devices and reading one or more blocks of data specified in said command from said source storage device and storing said read data in said cache memory, wherein any such block of data may comprise less than a full track of data and may start at an offset from the beginning of the track,
said control processor associating a write pending flag with said stored read data, and
said control processor destaging said stored read data blocks from cache memory to said destination storage device.

7. The storage system of claim 6 wherein said storage devices are ones of disk drives and tape drives, and said storage controller further comprises:

a channel adapter containing said at least one input port and connected to said cache memory, a first disk adapter connected to said cache memory and containing a first of said output ports, and a second disk adapter connected to said cache memory and containing a second of said output ports.

8. The system of claim 6 wherein said destination storage device cannot be read from said outside source.

9. The storage system of claim 6 wherein the source storage device and the destination storage device both have read access and write access.

10. The storage system of claim 9 wherein the source storage device and the destination storage device both have read access and write access.

11. A system for transferring data from a first storage device accessible to a first command processor to a second storage device accessible to a second command processor but not said first command processor comprising:

a cache memory, at least one input port and an output port, a control processor connected to the at least one input port and said output port, said control processor receiving a transfer command from said first command processor at said at least one input port, said control processor responding to said transfer command by reading blocks of data specified in said command from the first storage device and storing said read data in said cache memory, said control processor associating a write pending flag with said stored read data, said control processor destaging said write pending data from said cache memory to said second storage device, and said control processor making said data in said second storage device available at said output port.

12. The system of claim 11 wherein the first and second storage devices have both read access and write access.

13. The system of claim 12 wherein the first and second storage devices are disk drive storage units.

14. A method for transferring blocks of data from a first storage device to a second storage device, said second storage device being accessible to a second command processor but not a first command processor, said method comprising the steps of:

receiving an internal copy command from said first command processor over a controller input path, reading at least one block of data, in data blocks, from said first storage device, storing said read data in a volatile memory in said controller and setting a state of said stored data as a write pending state, destaging said write pending data from said volatile memory to said second storage device, and reading said data from said second storage device by said second command processor.

15. The method of claim 14 wherein the first and second storage devices have both read access and write access.

16. The method of claim 15 wherein the first and second storage devices are disk drive storage units.

* * * * *